Jan. 27, 1942. L. W. WILLIAMS 2,271,054
FILTER
Filed Dec. 1, 1939
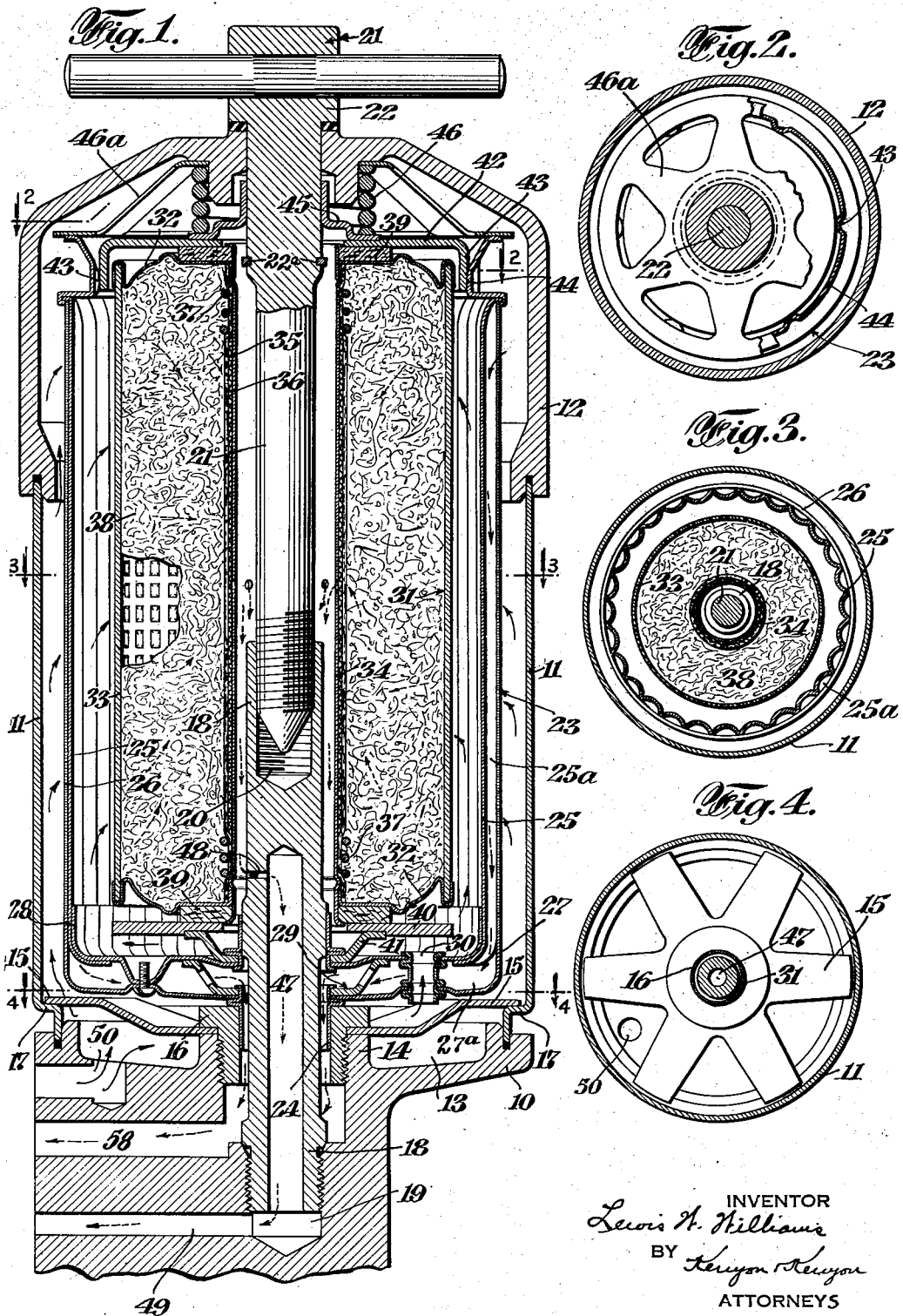
INVENTOR
Lewis W. Williams
BY Kenyon & Kenyon
ATTORNEYS Patented Jan. 27, 1942

2,271,054

UNITED STATES PATENT OFFICE 2,271,054

FILTER

Lewis W. Williams, Short Hills, N. J., assignor to Motor Improvements, Inc., Newark, N. J., a corporation of Delaware Application December 1, 1939, Serial No. 307,073

9 Claims. (Cl. 210—131)

This invention relates to filters and more especially to filters for use in connection with the lubrication system of an internal combustion engine.

There are two different classifications of impurities usually present in the lubricant of an internal combustion engine. One of these impurities may be defined as abrasive particles of such size as to be injurious to the working parts of the engine and the other impurities may be defined as solid particles of such minute size as not to be injurious to the working parts of the engine, but give the oil an undesirable color. It is important that all impurities of the first classification be removed from lubricant supplied to the working parts of the engine for protection thereof and it is desirable that impurities of the second classification be removed to improve the general character and appearance of the lubricant.

An object of this invention is a filter embracing within a single housing a pair of different type filtering units having a common dirty oil inlet and individual filtered oil outlets.

In one embodiment of this invention, one filtering unit preferably is of the type fully illustrated in the patent to R. P. F. Liddell, No. 2,042,537, and is capable of removing the impurities of the first class while the second filtering unit preferably consists essentially of a thick body of filtering material which is capable of removing the impurities of the second class. The second filtering unit is contained within the first filtering unit, thereby providing a compact assembly which is enclosed within a single housing. Means are provided within the casing for dividing the oil to be filtered into two streams, one of which flows only through the first filtering unit and the other of which flows only through the second filtering unit and each stream is discharged from the filter through a separate outlet.

Other objects, novel features and advantages of this invention will become apparent from the following specification and accompanying drawing, wherein:

Fig. 1 is a vertical section through one embodiment of the invention;

Fig. 2 is a section on the line 2—2 of Fig. 1, partially broken away;

Fig. 3 is a section on the line 3—3 of Fig. 1, and

Fig. 4 is a section on the line 4—4 of Fig. 1.

In the embodiment of the invention illustrated in the drawing, the filter housing comprises a base 10, a cylindrical shell 11 having fluid-tight connection with the base and a cap 12 having a fluid-tight connection with the shell 11, said base, shell and cap being held in assembled relation by means subsequently to be described. The base is shaped to provide a sump 13, in which is a hollow interiorly threaded boss 14. A spider 15 having a central aperture of slightly larger diameter than the interior diameter of the boss 14 rests on the outer end of the boss and is held in place by the head of a hollow bolt 16 threaded into the boss. The outer edge of the spider engages a shoulder 17 formed in the shell 11, thereby holding the shell in assembled relation to the base. A post 18 coaxial of the boss 14 has its lower end threaded into a tapped recess 19 in the base. The post 18 terminates below the upper end of the shell 11 and is provided at its upper end with a tapped recess 20. A rod 21 extends through an aperture in the cap 12 and is threaded at its inner end for co-operation with the threads of the tapped recess 20. A head 22 on the rod 21 engages the outer surface of the cap and co-operates therewith to hold the same in assembled relation to the shell 11.

A filter unit assembly 23 has a bushing 24 snugly but removably fitting the interior of the hollow nut 16. This assembly comprises a fluted drum or cylinder 25 which supports a cylindrical filtering element 26 composed of a helix of metal ribbon provided on one face with spacing ribs to provide filtering interstices, such a filter being fully illustrated in U. S. Patent No. 2,042,537 of R. P. F. Liddell. The flutes are so formed as to provide longitudinal channels 25a closed at the upper end of the cylinder and open at the lower end. A cap 27 secured to the bushing 24 fits over the lower end of the cylinder 25 with its rim contacting the lower end of the helix 26. An annular plug 28 is fitted into the lower end of the cylinder 25 and receives the post 18 in its central aperture. The plug 28 co-operates with the cap 27 to form a header or chamber 27a into which said longitudinal channels 25a discharge. A perforated spacer 29 serves to maintain the cap 27 and plug 28 in predetermined relationship and a tube 30 extends through both the cap 27 and plug 28.

A second filtering unit assembly 31 is arranged within the cylinder 25. This assembly consists of two imperforate annular end members 32 and two perforate cylindrical members 33 and 34 of which the edges of the member 33 are connected to the outer rims of the end members 32 and the edges of the member 34 are connected to the inner rims of the members 32. The member 34 surrounds the post 18 and rod 21 and is surrounded by a wire mesh tube 35 over which is arranged a layer of fabric 36, the latter being held in place by a tie member 37 at each end of the tube. The interior of the container 31 is filled with a body of suitable absorbent filtering material 38, preferably in the form of a spirally wound ribbon of cotton waste. In each end member 32 is provided a recess in which is arranged a gasket 39. The lower gasket 39 rests on an annular platform 40 supported from the plug 28 by a bracket 41. On the upper gasket 39 rests a platform 42 having a downturned flange, the outer surface of which engages inwardly projecting offsets 43 formed in a collar 44 extending from the upper end of the cylinder 25. A sleeve 45 is slidably mounted on the rod 21 and has a flange engaging the top surface of the platform 42. A spring 46 tends to force the platform 42 against the top gasket 39, thereby producing a fluid-tight seal therebetween as well as between the bottom gasket 39 and the platform 40. A collar 22a on the rod 21 limits movement of the sleeve 45 on said rod. A resilient spider 46a carried by the cap 12 engages the upper edge of the collar 44 to hold the assembly 23 in proper position.

In the lower end of the post 18 is provided a central passageway 47 communicating with the recess 19 and a restricted orifice 48 providing communication into the passageway 47 from the exterior of the post. The post is fitted snugly by the inner rim of the plug 28 but there is substantial clearance between the post and the inner wall of the bushing 24. The space thus provided communicates with a passageway 58 in the base leading to one face thereof. A passageway 49 leads from the recess 19 to said face of the base and a passageway 50 leads from such face to the sump.

In the operation of the above-described filter, dirty oil is supplied to the housing through the passageway 50. Some of such oil passes through the interstices in the filtering unit 26 into the channels 25a from which it is discharged into the header 27a formed by the cap 23. From the header, the filtered oil passes through the bushing 24 to the passageway 58 which is suitably connected to the working parts of the engine. The remainder of the oil passes into the interior of the cylinder 25 either through the tube 30 or through the spaces provided by the offsets 43 of the collar 44. Such oil passes through the perforations in the cylindrical member 33 into the body of the filtering material and out of such body through the perforations in the wall 34 into the space between such wall and the post 18 and rod 21. From this space, the filtered oil passes through the orifice 48 into the passageway 47 and thence through the passageway 49 to the crankcase or other reservoir. A portion of the oil is thus subjected to the action of one type of filtering unit while the remainder of the oil is subjected to the action of another type of filtering unit. The proportion of oil passing through each filtering unit is determined by the size of the orifice 48. Both filtering units are mounted within a single casing, thus avoiding the necessity of duplicate housings and providing a compact arrangement.

The filtering units may be renewed or reconditioned by removal of the cap 12, thereby releasing the platform 42 which can be removed to free the assembly 31 for removal and replacement by a new unit. Also, with the cover removed, the assembly 23 may be lifted out and cleaned in any well-known manner and then replaced.

I claim:

1. An oil filter comprising a casing, a cylindrical filtering element in said casing, a supporting cylinder surrounded by said filtering element and formed to provide longitudinal channels open at one end, a chamber communicating with the open ends of said channels, an outlet for said chamber, an inlet passageway to the interior of said cylinder from the interior of said casing, a body of absorbent filtering material within said cylinder, an outlet from the interior of said cylinder, and means requiring all oil flowing from said inlet passageway to said outlet to pass through said body of filtering material.

2. An oil filter comprising a casing, a pair of filtering elements supported within said casing with one filtering element enclosing the other filtering element, an inlet and two outlets for said casing, and means for continuously directing part of the oil in the casing solely through one filtering element to one outlet and the remainder of the oil solely through the other filtering element to the remaining outlet.

3. An oil filter according to claim 2 in which the enclosed filtering element comprises a body of absorbent filtering material and the enclosing filtering element comprises a foraminous metal cylinder.

4. An oil filter comprising a casing, a cylindrical filtering element in said casing, a closed end supporting cylinder surrounded by said filtering element and formed to provide longitudinal channels open at one end, a cap on said cylinder co-operating with its closed end to form a chamber with which the open ends of said channels communicate, an outlet for said chamber, a tube traversing said chamber and communicating with both the interior and exterior of said cylinder, a body of absorbent filtering material within said cylinder, an outlet from the interior of said cylinder, and means requiring all oil flowing from said tube to said outlet to pass through said body of filtering material.

5. An oil filter comprising a casing, a cylindrical filtering element in said casing, a closed end supporting cylinder surrounded by said filtering element and formed to provide longitudinal channels open at one end, a cap on said cylinder co-operating with its closed end to form a chamber with which the open ends of said channels communicate, an outlet for said chamber, a tube traversing said chamber and communicating with both the interior and exterior of said cylinder, a container within said cylinder, said container comprising a pair of imperforate annular end members and a pair of perforate different diameter cylindrical members connected thereto, a body of absorbent filtering material within said container, means sealing the inner cylindrical member of said container at the ends thereof, and an outlet leading from said inner cylindrical member.

6. An oil filter comprising a casing, a cylindrical filtering element in said casing, a supporting cylinder surrounded by said filtering element and formed to provide longitudinal channels open at one end, a chamber communicating with the open ends of said channels, an outlet for said chamber, an inlet passageway to the interior of said cylinder from the interior of said casing, a container within said cylinder, said container comprising a pair of imperforate annular end members and a pair of perforate different diameter cylindrical members connected thereto, a body of absorbent filtering material within said container, means sealing the inner cylindrical member of said container at the ends thereof, and an outlet leading from said inner cylindrical member.

7. A filter comprising a base having a hollow boss, a casing co-operating with said boss to form a housing, a cylindrical filtering element in said housing, a closed end supporting cylinder surrounded by said filtering element and formed to provide longitudinal channels open at one end, a cap on said cylinder co-operating with its closed end to form a chamber with which the open ends of said channels communicate, a sleeve on said cap snugly fitting the interior of said boss, a tube traversing said chamber and communicating with both the interior and exterior of said cylinder, a container within said cylinder comprising a pair of spaced imperforate annular end members and a pair of perforate different diameter cylindrical members connected thereto, a body of absorbent filtering material in said container, a post threaded to said base in spaced relation to the inner wall of said boss and passing through the inner cylindrical member of said container, means co-operating with said post to lock said casing to said base, means on said post sealing the ends of said inner cylindrical member, and a passageway in said post communicating with said inner cylindrical member.

8. A filter comprising a base having a hollow boss, a post threaded to said base in spaced relation to the inner wall of said boss, a shell co-operating with said base to form a casing, means co-operating with said post for attaching said shell to said base, a cylinder in said casing surrounding said post and formed to provide longitudinal channels open at one end, a cylindrical filtering element surrounding and supported by said cylinder, said cylinder having an end wall adjacent the open end of said channels snugly fitting said post, a cap on said cylinder forming a chamber with said end wall communicating with the open ends of said channels, a sleeve carried by said cap and snugly fitting the interior surface of said hollow boss, a container within said cylinder, said container comprising a pair of spaced imperforate annular end members coaxial with said post and a pair of perforate different diameter cylindrical members connected thereto, means sealing the ends of the inner cylindrical member of said container, a body of absorbent filtering material in said container, and a passageway in said post communicating with the inner cylindrical member of said container.

9. A filter comprising a base having a hollow boss, a post threaded to said base in spaced relation to the inner wall of said boss, a shell co-operating with said base to form a casing, means co-operating with said post for attaching said shell to said base, a cylinder in said casing surrounding said post and formed to provide longitudinal channels open at one end, a cylindrical filtering element surrounding and supported by said cylinder, said cylinder having an end wall adjacent the open end of said channels snugly fitting said post, a cap on said cylinder forming a chamber with said end walls communicating with the open ends of said channels, a sleeve carried by said cap and snugly fitting the interior surface of said hollow boss, a container within said cylinder, said container comprising a pair of spaced imperforate annular end members coaxial with said post and a pair of perforate different diameter cylindrical members connected thereto, a sealing member carried by said post engaging one end of said container, a second sealing member slidably supported by said shell and engaging the other end of said container, resilient means urging said second sealing member toward said first sealing member, a body of absorbent material in said container, and a passageway in said post communicating with the inner cylindrical member of said container.

LEWIS W. WILLIAMS.